United States Patent [19]

Wang

[11] Patent Number: 4,543,006
[45] Date of Patent: Sep. 24, 1985

[54] FOLDABLE MULTI-POSITION LADDER JOINT

[76] Inventor: Chien-Yuan Wang, No. 17, Alley 6, La. 24, Pa Te Rd., Sec. 4, Taipei, Taiwan

[21] Appl. No.: 672,201

[22] Filed: Nov. 16, 1984

[51] Int. Cl.[4] .................. F16C 11/00; E05D 11/10; E06C 7/50
[52] U.S. Cl. .................................. 403/93; 182/163; 16/332; 16/334; 16/349
[58] Field of Search .............. 403/95, 93, 102, 96, 403/328, 322; 297/367, 365; 182/163, 164; 16/332, 334, 349, 325, 324, 344

[56] References Cited

U.S. PATENT DOCUMENTS 3,655,012  4/1972  Hoffman et al. ............. 182/163
3,955,240  5/1976  Schuh et al. ................. 403/93
4,236,753  12/1980  Ooshiro et al. .............. 16/349

FOREIGN PATENT DOCUMENTS 2508573  9/1976  Fed. Rep. of Germany ........ 182/24

Primary Examiner—Cornelius J. Husar
Assistant Examiner—Peter M. Cuomo
Attorney, Agent, or Firm—Burns, Doane, Swecker and Mathis

[57] ABSTRACT

Improvements in a foldable multi-position ladder joint in which one side of the locking disk of the second joint member is provided between each notch thereof and the common axial bolt with cams capable of one-way rotation under the driving action of the release element of the operating lever. The other end of the cam shaft returns the cam to its normal position upon pivoting movement of a ratchet hooked with a tension spring. Swinging of the operating lever in disengaging the locking pawl from a notch concomitantly moves the corresponding cam to rotate thereby making way for the release element to pass over and subsequent turning of the cam back to its normal position. Release of the release element is however prevented making possible the closing of the notch in achieving directly the purpose of whether or not the pawl is to be engaged in the notch.

References are given here to applicant's prior U.S. applications with Ser. Nos. 532,096 and 543,445 with filing dates Sept. 14, 1983 and Oct. 19, 1983 respectively.

2 Claims, 8 Drawing Figures

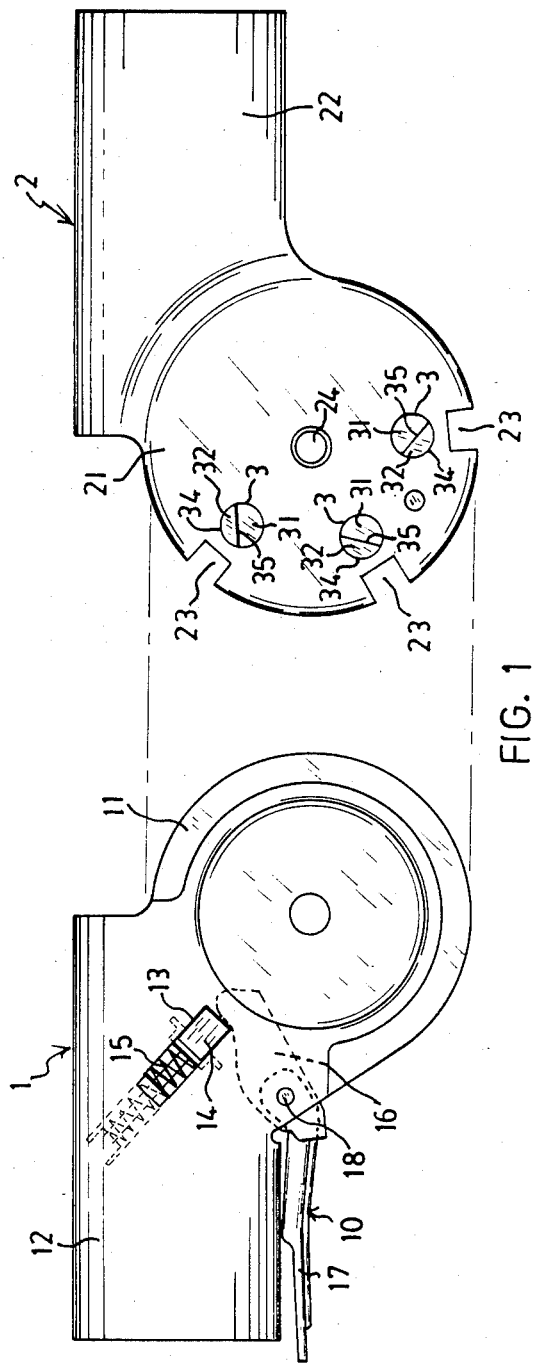
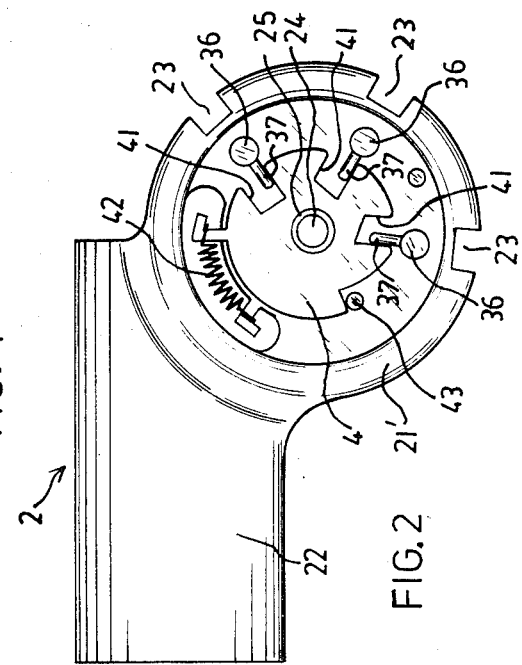

FOLDABLE MULTI-POSITION LADDER JOINT

DETAILED DESCRIPTION

The present invention relates to a multi-position joint for use in folding ladders and the like, and more particularly, to a joint where a pair of joint members are connected one to the other pivotally round a common axial bolt and are capable of locking in at least one predetermined angular position. Improvements are made in the joint where one side of the locking disk of the second joint member is provided between each notch thereof and the common axial bolt with a cam capable of one-way rotation under the push action of the release element of the operating lever.

In a conventional folding ladder, the multi-position joint usually comprises a first member having at its front end two spaced-apart, symmetrically arranged disks and an operating lever and a locking element mounted therebetween and a second member having at its front end a hollow, flat locking disks formed of a pair of circular shell halves encasing a spring-biased sector-shaped ratchet and having notches in its circumferential edge, the two members being pivotally connected together capable of locking in a predetermined angular position. In the joint of such construction when the operating lever is operated to cause disengagement of the locking element from its associated notch, the sector-shaped ratchet provided in the second joint member will close that notch to prevent return of the locking element into same while disclosing the notch at the desired position for the ratchet to engage. That is, upon shifting of the lockable positions or folding and unfolding of the ladder sections, the ratchet acts to permit or hinder engagement of the locking element in the respective notches by disclosing or closing the appropriate notch. However, since the ratchet is formed with peripheral teeth each of which projects outwardly of the joint through a notch, the outwardly projecting teeth tend to cause injuries to the user, or to become caught on clothing. In addition, such teeth may result in malfunction of the joint due to susceptibility to damage when encountering impacts or external forces. Moreover, since the locking disk of the second joint member is constructed of two symmetrically superposed shell halves of sheet metal, it will be rather cumbersome to assemble the ratchet and the spring for biasing the ratchet within the locking disk during the manufacturing process.

Accordingly, the present invention overcomes the above-enumerated disadvantages by providing an improved and most novel type of joint which ensures safety in use while being easy to operate.

It is the object of the invention to provide a multiposition ladder joint which employs a plurality of cams disposed inner to each notch to prevent or release the action of the operating lever, thereby directly effecting the disclosing or closing of the notch to permit whether or not the locking element is to be engaged in that notch.

Other objects and features of the present invention will become apparent from the following detailed description taken in connection with the accompanying drawings wherein:

FIG. 1 is an exploded view of a ladder joint according to the invention;

FIG. 2 is a rear view of a second joint member of the ladder joint;

Figure 3:
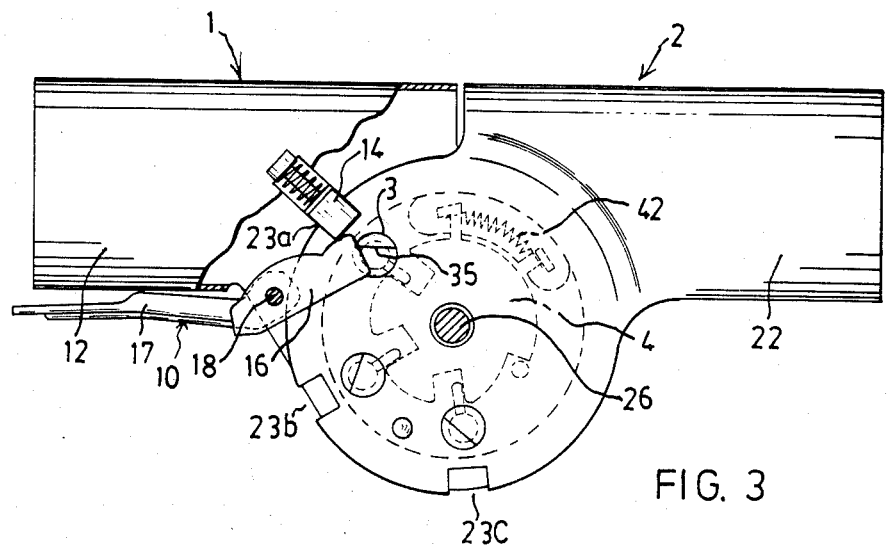
FIG. 3 shows the ladder joint in its extended position and locked condition.

Referring to FIG. 1, the multi-position joint in accordance with the present invention comprises a first joint member 1 and a second joint member 2 wherein each of said joint members is similar in construction to a conventional one. The first joint member 1 is formed in a well known manner of sheet metal pressed into a disk portion 11 having two spaced-apart, symmetrically arranged disks from which extends a substantially flat tubular portion 12. The tubular portion 12 is provided with two rectangular slots 13, one on each side thereof, and a bricklike pawl 14 slidably engaged at both ends in the slots 13 and spring-biased towards the disk portion 11 by a spring 15. A manually operated operating lever 10, as disclosed in applicant's pending U.S. Pat. Nos. 532,096 and 543,445, is composed of a forked release element 16 and a handle 17 and is pivotably connected to the disk portion 11 by a pivot pin 18 at a point close to the tubular portion 12.

The second joint member 2, also formed in a conventional manner of sheet metal by pressing, comprises a flat locking disk 21 formed of a pair of circular shell halves and an integrally formed flat tubular poriton 22. The locking disk 21 is provided with circumferentially distributed notches 23 in its closed peripheral edge. Disposed between the notches 23 and a central axial hole 24 on one shell half of the locking disk 21 are cylindrical step cams 3 having a lower base face 31 and a higher or projecting half-moon-shaped top face 32. The top face 32 is provided with an outer semicircular surface 34 and an inner flat surface 35.

As shown in FIG. 2, the other shell half 21' of the second joint member 2 has its central portion formed by pressing into an inwardly depressed circular flat surface provided thereon with a plate like ratchet 4 which is pivotally mounted on an axial bush 25 disposed in the axial hole 24. The outer edge of the ratchet 4 is provided with equal number of notches 41 as that in the disk 21, while one edge thereof is formed with a hook and connected by a tension spring 42 to the shell half 21'. The shell half 21' is provided thereon with a stop pin 43 whereby the ratchet 4 under the external force will act against the spring force to rotate towards one side only while counter rotation thereof is being prevented. Disposed inner to each notch 23 on the disk 21, shafts 36 of the cylindrical cams 3 of one shell half protrude on the surface of the other shell half 21', each shaft 36 having an extended arm 37 projecting inwardly into the corresponding notch 41 of the ratchet 4.

It is apparent from FIG. 3 that in the ladder joint of the present invention, the first joint member 1 is pivotally connected to the second joint member 2 by a common axial bolt 26 and together they form a single unit. When the tubular portions 12, 22 are in an extended position, the pawl 14 suitably engages in the notch 23a and the front edge of the release element 16 under the clockwise force exerted by the pawl 14 and the flat surface 35 causes the handle 17 to abut the underside of the tubular portion 12.

Figure 4:
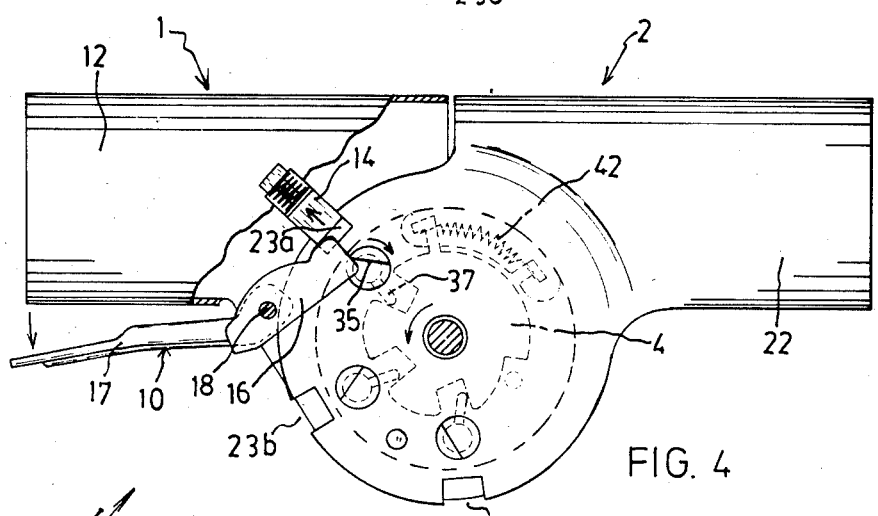
FIG. 4 to FIG. 7 are schematic views illustrating the operation of the ladder joint according to the invention.

As shown in FIG. 4, when it is desired to adjust the angular position of the first and second joint members, this can be done by first swinging the handle 17 relative to the tubular portion 12 of the first member. The release element 16 at the other end of the operating lever 10 will turn in a counter-clockwise direction about the pivot pin 18 to push the pawl 14 outwardly away from the notch 23a, while on the other hand, the edge of the release element 16 will cause the cam 3 to rotate in a clockwise direction so that the extended arm 37 at the other side of the cam 3 will in turn move the ratchet 4 to rotate in a counter-clockwise direction against the action of the spring 42.

Figure 5:
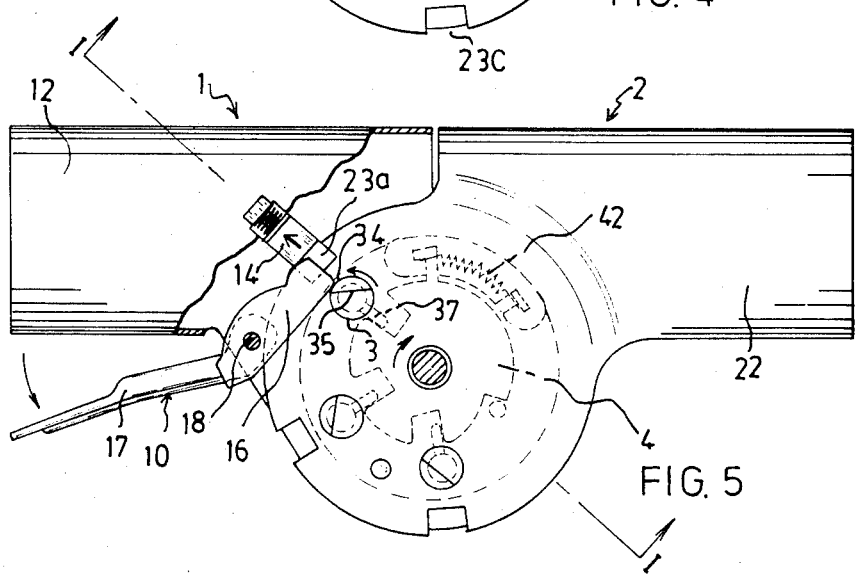
Figure 6:
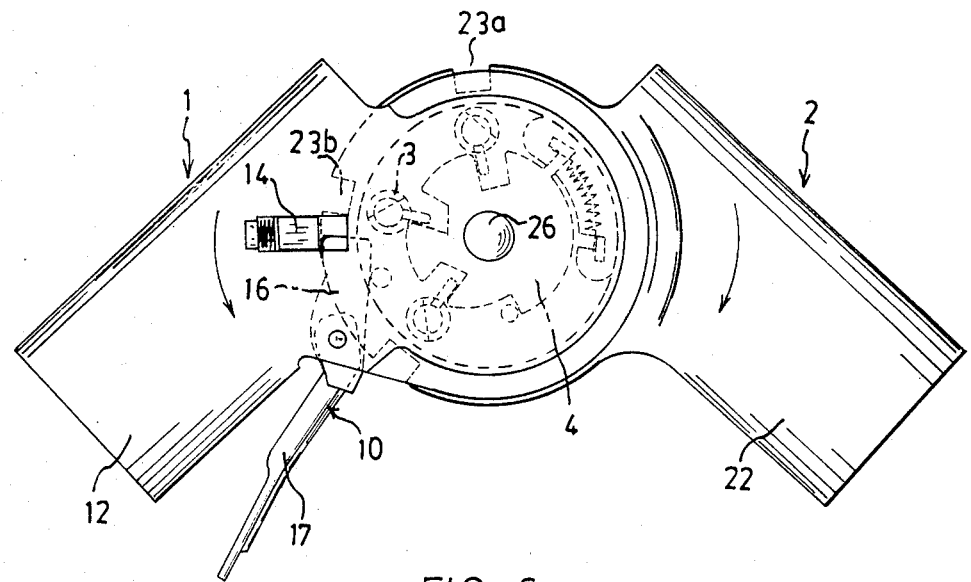
Figure 7:
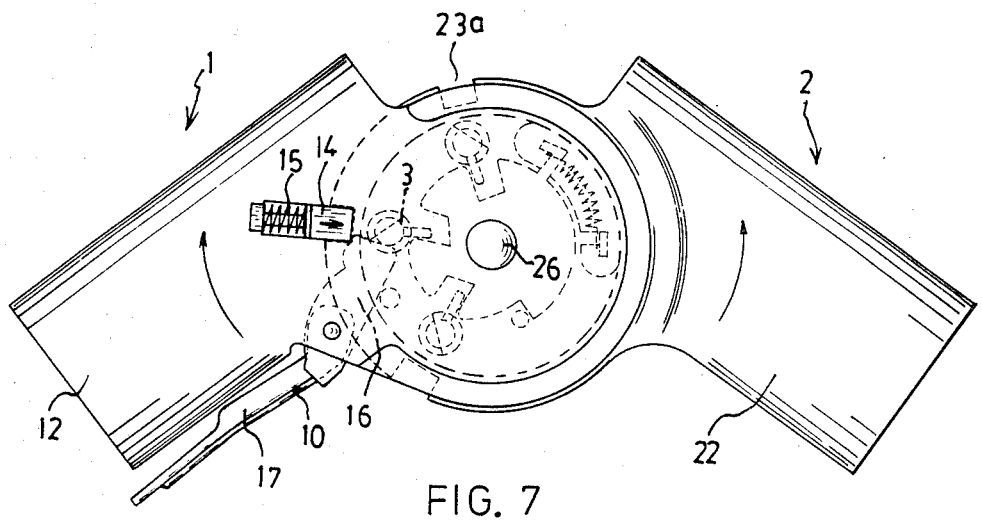
Figure 8:
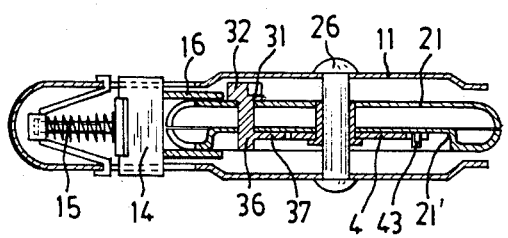
FIG. 8 is a cross section taken along the line I—I of FIG. 5.

With reference to FIG. 5, upon disengagement of the pawl 14 from the notch 23a the end portion of the release element 16 will slide over the edge of the cam 3, and as the external force exerted on the cam 3 disappears, the ratchet 4 released from the action of the extended arm 37 of the cam 3 at this moment will be urged by the spring 42 to return to its normal position. The outer semicircular surface 34 of the cam 3 stops at the underside of the release element 16 so as to prevent the latter from moving towards the inner side, thereby indirectly preventing the pawl 14 from falling back in the notch 23a. In this way, the first and the second joint members of the ladder joint according to the present invention can be folded with respect to each other as indicated by arrows in FIG. 6. During this movement, the pawl 14 will slide along the peripheral edge of the disk 21 of the first joint member 1. When the pawl 14 passes over the notch 23b, since the underside of the release element 16 is sliding over the outer semicircular surface 34, the pawl 14 being prevented by the release element 16 now will not be engaged in the notch 23b. Hence, to enable the pawl 14 to be engageable with the notch 23b, the pawl must first pass over the notch 23b to permit the front end of the release element 16 to pass through the cam 3. The joint members 1, 2 are then pivoted with resepct to each other in an opposite direction as indicated by arrows in FIG. 7. During this movement, since the front end of the release element 16 is being blocked by the inner flat surface 35 of the cam 3, when the pawl 14 passes over the notch 23b it will be urged by the spring 15 and will thus fall into the notch 23b, thereby securing effectively another angular position.

It is apparent from the above description that at each angular position of the ladder joint, upon swinging of the operating handle 17 the release element 16 will disengage the pawl 14 from its associated notch 23, while inner to the notch the corresponding outer semicircular surface 34 of the cam 3 will block the release element 16 at its underside, thereby preventing the release element 16 from returning to its normal position so as to maintain the pawl 14 in a position outside the notch. Until and unless the front end of the release element 16 has passed through the outer semicircular surface 34 of the cam 3 and is blocked at the lower side of the inner flat surface 35 thereof, the pawl 14 will not be engaged in the notch 23. Hence, the cam 3 of the present invention has the function of disclosing and closing of the notches and works with preciseness and stability.

I claim:

1. A foldable multi-position ladder joint comprising:

a first joint member formed with a disk-shaped portion composed of a pair of spaced-apart, opposed circular disks from which extends a flat tubular portion having in opposite side thereof two slots through which is slidably supported a spring-biased pawl operable by an operating lever pivotally connected to said tubular portion, said operating lever being composed of a forked release element received within the disk-shaped portion and a handle extending outwardly of the disk-shaped portion, said release element and handle being pivotally connected together by a pin;

a second joint member formed with a flat, hollow locking disk from which extends a tubular portion, said locking disk provided with a plurality of circumferentially distributed notches engageable with said pawl and a control means for controlling disclosing and closing of said notches, said first and second joint members being pivotally connected together by a common axial bolt passing through the centers of the disk-shaped portion of the first joint member and the locking disk of the second joint member which is concentrically disposed between the disks of said disk-shaped portion;

and improvements characterized in that one side of the locking disk of the second joint member is provided between the corresponding notches and the axial bolt with a corresponding plurality of protruding cams each having an axial shaft, each cam having an outer semicircular surface and an inner flat surface, the shafts of said cams having their projected portions on the other side of said locking disk formed with extended arms, each said extended arm being received in a respective notch formed in the periphery of a ratchet, said ratchet being pivotally mounted on the axial bolt and hooked by a tension spring to said locking disk.

2. A foldable multi-position ladder joint as defined in claim 1, wherein said inner flat surface of the cam may be urged to rotate against the deviating action of the release element, thereby rotating said cam and shaft to pivot the ratchet at the other side of the second joint member against the resilient action of the tension spring, and may return to its normal position together with said cam being urged by said spring when said release element passes over to permit the outer semicircular surface to be stopped at the underside of said release element, thereby blocking the pawl from falling into the notch of the locking disk.

* * * * *